UNITED STATES PATENT OFFICE.

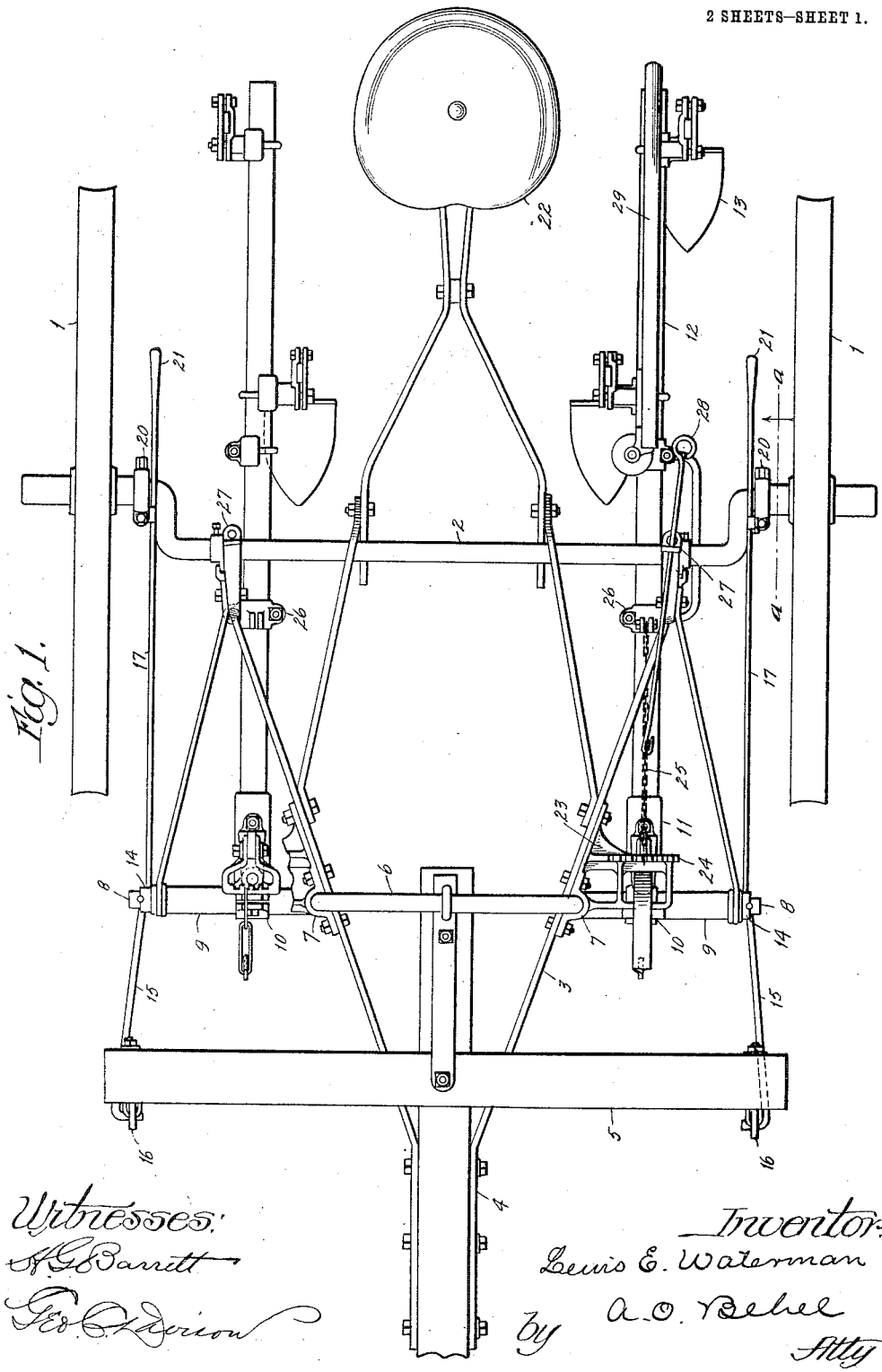

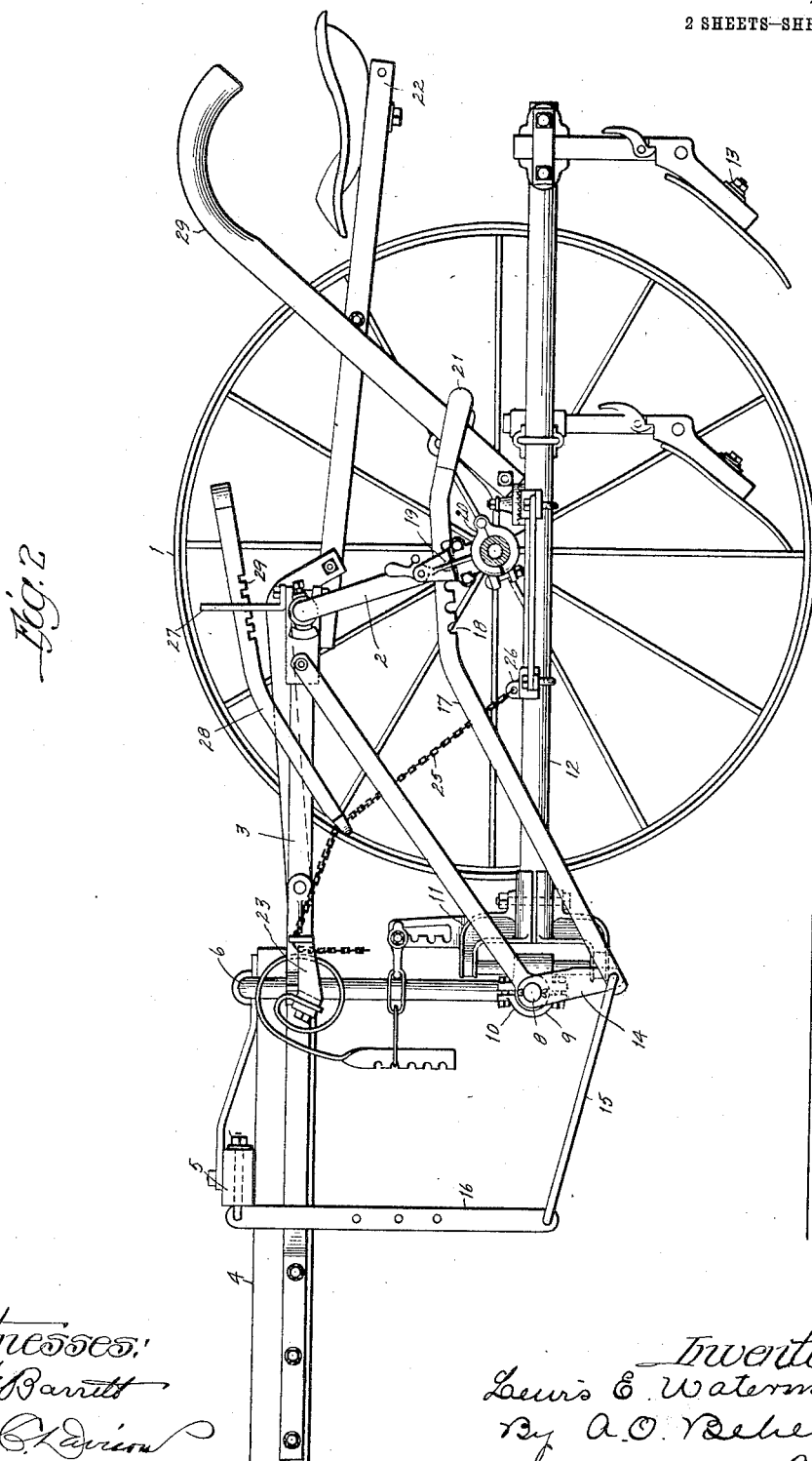

LEWIS E. WATERMAN, OF ROCKFORD, ILLINOIS, ASSIGNOR TO EMERSON-BRANTINGHAM COMPANY, A CORPORATION OF ILLINOIS.

CULTIVATOR.

1,044,714.      Specification of Letters Patent.      Patented Nov. 19, 1912.

Application filed September 30, 1911. Serial No. 652,184.

*To all whom it may concern:*

Be it known that I, LEWIS E. WATERMAN, a citizen of the United States, residing at Rockford, in the county of Winnebago and State of Illinois, have invented certain new and useful Improvements in Cultivators, of which the following is a specification.

The object of this invention is to provide simple means for adjusting the working depth of the shovels, also to adjust the counterbalance of the frame.

In the accompanying drawings. Figure 1 is a plan view of a cultivator containing my improvements. Fig. 2 is a section on line *a a* Fig. 1.

The wheels 1 support a cranked-axle 2 and to the axle is pivotally connected the rear portion of the frame 3. A tongue 4 is bolted to the forward end of the frame. An evener 5 is pivotally connected to the rear portion of the tongue. A yoke 6, is fixedly connected to the rear end of the tongue and by the brackets 7 to the frame that is pivoted to the axle 2. On the horizontal ends 8 of the yoke are loosely mounted sleeves 9, to each of which is clamped a split collar 10, and to the collar is connected a yoke 11 fixedly connected to the forward end of a beam 12, supporting shovels 13.

To each of the horizontal ends 8 of the yoke 6 is connected an arm 14, to the lower end of which is connected a draft rod 15, and to the draft rod is connected a pendant 16 which is connected to the evener 5.

To each of the arms 14 is pivotally connected a bar 17 having its under edge formed with notches 18, any one of which is adapted to receive a projection 19 extending from a collar 20 clamped to the axle 2. As the axle 2 is pivotally connected to the rear end of the frame 3, the wheels 1 supporting the axle may be moved in the direction of the line of draft and held when adjusted by the bars 17. The free ends of the bars 17 are in handle form as at 21.

A driver's seat 22 is supported by the axle 2 and main frame, and by moving the wheel bodily in the direction of the line of draft, the driver's weight can counterbalance so as to relieve the horses' necks of excess weight.

A bracket 23 for each side of the cultivator is secured to the main frame 3, and is formed with a plurality of notches 24. A chain 25 has one end connected to a collar 26 connected to a beam 12 and its other end is located in one of the notches 24 in the bracket 23. From the rear portion of the frame extend two brackets 27 which guide bars 28 having their under edge formed with notches 29 which receive the brackets and hold the bar from lengthwise movement. The forward ends of the bars 28 are in hook form and receive the chains 25. By moving these bars 28, the working depth of the shovels can be regulated.

To each of the beams 12 is connected a handle 29 by which the beams can be raised and swung laterally.

I claim as my invention.

1. In a cultivator, the combination of a frame, supporting wheels, beams connected to the frame, a chain connected at one end to a beam, and at its other end to the frame, and a bar provided with notches which engage the main frame, the other end of the bar engaging the chain between its ends.

2. In a cultivator, the combination with a frame, of a beam adjustably mounted on the frame, a flexible member having its end portions connected to the frame and beam, and a bar engaged with the member between said end portions and having a sliding and interlocking engagement with the frame to secure the member in its flexed relations and thereby hold the beam in various positions.

3. In a cultivator, the combination with a frame member, of a swinging beam member pivotally connected thereto, a bracket carried by one member, a flexible connection connected to the other member and having an adjustable engagement with the bracket, and an adjusting bar engaged with the flexible connection between the bracket and beam and having a sliding and interlocking engagement with the frame for flexing the connection and thereby adjusting the beam.

4. In a cultivator, the combination with a frame member, of a beam movably mounted thereon, a flexible connection secured at one end to the beam and at its other end to the frame, an adjusting bar having a terminal hook engaged with the connection between its ends and having a plurality of notches formed along the same, and a device carried by the frame and engaging in the different notches to hold the bar in different positions with the flexible member flexed to different degrees.

In testimony whereof I have hereunto set my hand in presence of two subscribing witnesses.

LEWIS E. WATERMAN.

Witnesses:
 A. O. BEHEL,
 E. D. E. N. BEHEL.

Copies of this patent may be obtained for five cents each, by addressing the "Commissioner of Patents, Washington, D. C."